(12) United States Patent
Frydman et al.

(10) Patent No.: US 8,419,843 B2
(45) Date of Patent: Apr. 16, 2013

(54) SYSTEM FOR INTEGRATING ACID GAS REMOVAL AND CARBON CAPTURE

(75) Inventors: Arnaldo Frydman, Houston, TX (US); Pradeep Stanley Thacker, Houston, TX (US); Sachin Suhas Naphad, Katy, TX (US)

(73) Assignee: General Electric Company, Schenectady, NY (US)

(*) Notice: Subject to any disclaimer, the term of this patent is extended or adjusted under 35 U.S.C. 154(b) by 288 days.

(21) Appl. No.: 12/782,683

(22) Filed: May 18, 2010

(65) Prior Publication Data

US 2011/0286894 A1 Nov. 24, 2011

(51) Int. Cl.
*B01D 53/14* (2006.01)

(52) U.S. Cl.
USPC ............ 96/234; 95/163; 95/174; 95/176; 95/181; 95/183; 95/199; 95/223; 95/235; 95/236

(58) Field of Classification Search ............ 422/187; 96/193, 201, 234, 242; 95/160, 172, 181, 95/183, 199, 235–236, 159, 161, 163, 173, 95/174, 176, 177, 178, 179, 192, 193, 208, 95/209, 223
See application file for complete search history.

(56) References Cited

U.S. PATENT DOCUMENTS

| | | | |
|---|---|---|---|
| 5,319,924 A | 6/1994 | Wallace et al. | |
| 5,345,756 A | 9/1994 | Jahnke et al. | |
| 6,241,874 B1 | 6/2001 | Wallace et al. | |
| 6,342,091 B1 * | 1/2002 | Menzel et al. | 95/167 |
| 7,708,801 B2 | 5/2010 | Thacker et al. | |
| 2002/0104438 A1 | 8/2002 | Cadours et al. | |
| 2003/0083390 A1 | 5/2003 | Shah et al. | |
| 2007/0000239 A1 | 1/2007 | Liu et al. | |
| 2007/0000243 A1 | 1/2007 | Liu et al. | |
| 2008/0047259 A1 | 2/2008 | Frydman et al. | |
| 2009/0031630 A1 | 2/2009 | Naphad et al. | |
| 2009/0057202 A1 | 3/2009 | Kulkarni et al. | |
| 2009/0095155 A1 | 4/2009 | Frydman et al. | |
| 2009/0120285 A1 | 5/2009 | Thacker et al. | |
| 2009/0173079 A1 | 7/2009 | Wallace et al. | |
| 2009/0173080 A1 | 7/2009 | Wallace et al. | |
| 2009/0173081 A1 | 7/2009 | Wallace et al. | |
| 2009/0239959 A1 | 9/2009 | Wallace et al. | |
| 2009/0239960 A1 | 9/2009 | Wallace et al. | |
| 2010/0018115 A1 | 1/2010 | Wallace et al. | |
| 2010/0043290 A1 | 2/2010 | Thacker et al. | |

FOREIGN PATENT DOCUMENTS

| | | |
|---|---|---|
| EP | 2388060 A2 | 11/2011 |
| WO | 2004052511 A1 | 6/2004 |

OTHER PUBLICATIONS

"Technoeconomic evaluation of IGCC power plants for CO2 Capture", Ordorica-Garcia et al, 2006, pp. 2250-2259.*
U.S. Appl. No. 12/428,416, filed Apr. 22, 2009.
U.S. Appl. No. 12/652,021, filed Jan. 4, 2010.
U.S. Appl. No. 12/652,026, filed Jan. 4, 2010.
U.S. Appl. No. 12/652,019, filed Jan. 4, 2010.

(Continued)

*Primary Examiner* — Duane Smith
(74) *Attorney, Agent, or Firm* — Fletcher Yoder (57) ABSTRACT

In one embodiment, a system includes a hydrogen sulfide ($H_2S$) absorber, a first flash tank, a flash gas treatment column, and a $CO_2$ absorber. The system also includes a first fluid path extending sequentially through the $H_2S$ absorber, the first flash tank, the flash gas treatment column, the $H_2S$ absorber, and the $CO_2$ absorber.

22 Claims, 6 Drawing Sheets

OTHER PUBLICATIONS

U.S. Appl. No. 12/726,039, filed Mar. 17, 2010.
U.S. Appl. No. 12/752,051, filed Mar. 31, 2010.
Ordorica-Garcia G. et al., Technoeconomic Evaluation of IGCC Power Plants for CO2 Avoidance, Energy Conversion and Management, Elsevier Science Publishers, Oxford, GB., vol. 47, No. 15-16, Sep. 1, 2006, pp. 2250-2259—XP026057959.
Sep. 23, 2011 Partial European Search Report for European Application No. 11165812.6-2113.
Ordorica-Garcia et al., "Technoeconomic Evaluation of IGCC Power Plants for CO2 Avoidance," Energy Conversion and Management, Elsevier Science Publishers, Oxford, GB, vol. 47, No. 15-16, Sep. 1, 2006 pp. 2250-2259.
EP Search Report for EP Application No. 11165812, mailed on Mar. 20, 2012.

* cited by examiner

SYSTEM FOR INTEGRATING ACID GAS REMOVAL AND CARBON CAPTURE

BACKGROUND OF THE INVENTION

The subject matter disclosed herein relates to carbon capture in gasification plants. More specifically, the subject matter disclosed relates to the integration of acid gas removal and carbon capture in a gasification plant.

Power plants, for example integrated gasification combined cycle (IGCC) power plants, may gasify a carbonaceous fuel such as coal to produce syngas. Other processes utilizing gasification include substitute natural gas (SNG) production. SNG production involves gasification of a carbonaceous feed to produce an untreated syngas product. The untreated syngas may include carbon monoxide (CO) and hydrogen ($H_2$), among other products. The syngas is treated and then converted to methane in a methanator reactor. One byproduct of gasification operations is carbon dioxide ($CO_2$). Unfortunately, existing systems may not efficiently use the $CO_2$ byproduct.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a hydrogen sulfide ($H_2S$) absorber, a first flash tank, a flash gas treatment column, and a $CO_2$ absorber. The system also includes a first fluid path extending sequentially through the $H_2S$ absorber, the first flash tank, the flash gas treatment column, the $H_2S$ absorber, and the $CO_2$ absorber.

In a second embodiment, a system includes a flash gas treatment column configured to integrate a $CO_2$ capture section with an acid gas removal (AGR) section. The flash gas treatment column has a solvent path configured to route solvent from the flash gas treatment column to the $CO_2$ capture section. The flash gas treatment column also has a gas path configured to receive flashed gas from the AGR section. The flash gas treatment column is configured to output $CO_2$ rich gas.

In a third embodiment, a system includes an acid gas removal (AGR) section, a carbon capture section, and a flash gas treatment column. The flash gas treatment column is configured to integrate the carbon capture section with the AGR section, and is also configured to output $CO_2$ rich gas and $H_2S$ entrained solvent.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present embodiments are generally directed towards retrofitting a gasification plant, regardless of its end application (e.g., power or chemicals), with carbon dioxide ($CO_2$) capture systems. For example, a baseline configuration for $CO_2$ capture retrofitting may include a flash gas treatment column, which may also be referred to as an integral absorber column or an $H_2S$ re-absorber. The flash gas treatment column may reduce the quantity of the total sulfur circulating through the AGR unit, may lower the amount of solvent that is sufficient for treating normal syngas production levels, and may increase the amount of $CO_2$ that is captured. Such benefits may be particularly advantageous at higher levels of $CO_2$ capture.

In some embodiments, the flash gas treatment column enables a gasification system to have more effective $CO_2$ capture, not only at lower $CO_2$ capture levels (such as those without water-gas shift reactors), but also in systems configured for higher levels of $CO_2$ capture (such as those with water-gas shift reactors). In some of the configurations presented herein, the flash gas treatment column allows nearly seamless expansion of plants to higher $CO_2$ capture levels. For example, the flash gas treatment column may enable a phased (gradual) expansion to higher levels of $CO_2$ capture without having to modify existing plant equipment. Further, in some embodiments the flash gas treatment column, using a $CO_2$-loaded solvent will not weaken the acid gas (e.g., lower the amount of sulfur in the acid gas), enabling usual operation of the Sulfur Recovery Unit (SRU), such as a Claus reactor.

Figure 1:
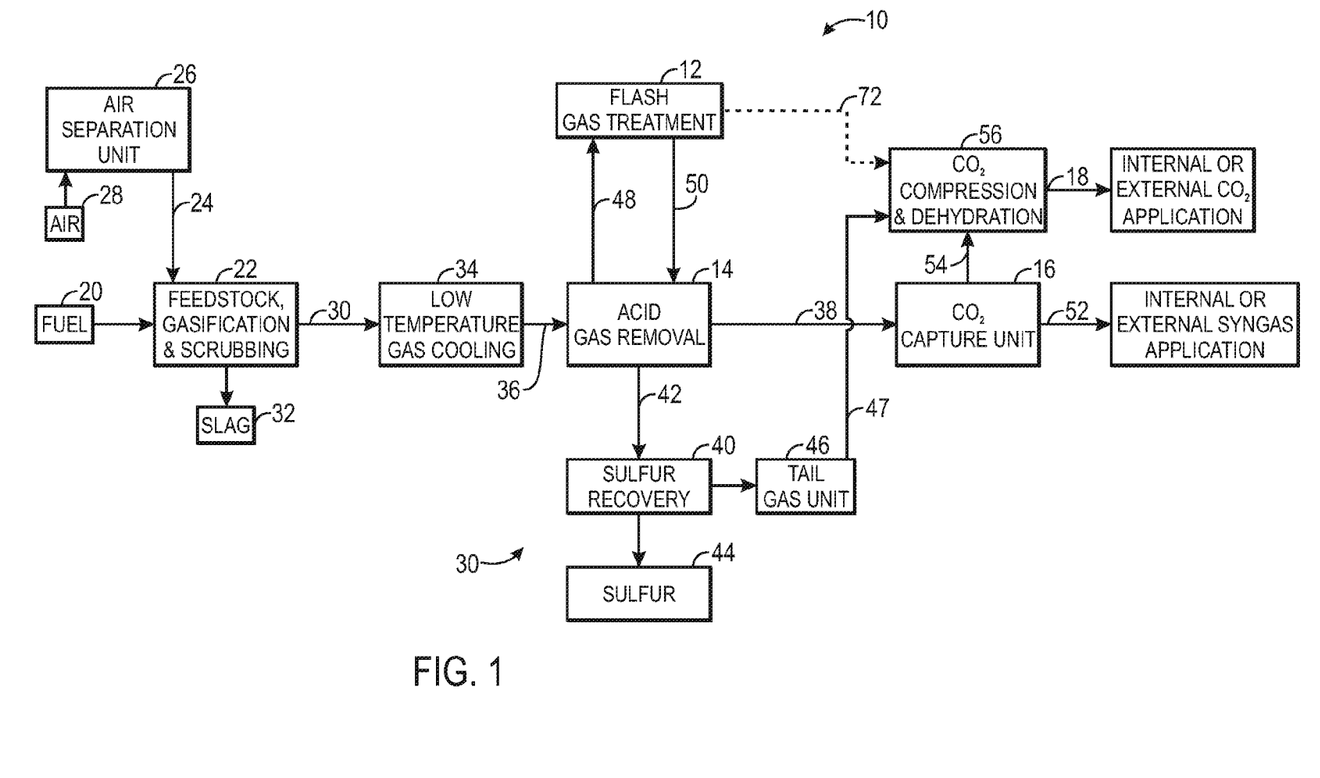
FIG. 1 is a block diagram of an embodiment of a gasification system utilizing a flash gas treatment column to integrate an AGR unit with a $CO_2$ removal unit.

FIG. 1 illustrates a block diagram of a gasification and treatment system 10 that utilizes a flash gas treatment column 12 to integrate an AGR unit 14 with a $CO_2$ capture unit 16 in accordance with the disclosed embodiments. According to further aspects of the present embodiments, the flash gas treatment column 12 also may allow higher levels of captured $CO_2$ 18. For example, the system 10 may be configured to perform $CO_2$ capture up to approximately 30% (e.g., approximately 1, 5, 10, 15, 20, 21, 22, 23, 24, 25, 26, 27, 28, 29, or 30%). That is, between approximately 20 and 30% of the carbon weight flowing through the system 10 is captured as $CO_2$. In one embodiment, by retrofitting the system 10 with the flash gas treatment column 12, it may be possible to increase the levels of carbon capture to above 30%, as described below.

System 10 includes, among other features, areas for generating syngas as well as treating syngas for various end uses. Elements of the system 10 may include a carbonaceous fuel source 20, such as a solid feed, that may be utilized as a source of energy and/or for the production of SNG. The fuel source 20 may include coal, petroleum coke, biomass, wood-based materials, agricultural wastes, tars, coke oven gas and asphalt, or other carbon containing items. The solid fuel of the fuel source 20 may be passed to a feedstock, gasification, and scrubbing system 22. The feedstock, gasification, and scrubbing system 22 may include several subsystems. For example, the feedstock, gasification, and scrubbing system 22 may include a feedstock preparation subsystem that may, for example, resize or reshape the fuel source 20 by chopping, milling, shredding, pulverizing, briquetting, or pelletizing the fuel source 20 to generate feedstock. Additionally, water, or other suitable liquids may be added to the fuel source 20 in the feedstock preparation subsystem to create slurry feedstock. In other embodiments, no liquid is added to the fuel source in the feedstock preparation subsystem, thus yielding dry feedstock.

The feedstock may be passed to a gasifier/cooler of the feedstock, gasification, and scrubbing system 22 from the feedstock preparation subsystem. The gasifier/cooler may be a syngas cooler (SGC) gasifier, which may convert the feedstock into a combination of CO and $H_2$, i.e., syngas. This conversion may be accomplished by subjecting the feedstock to a controlled amount of steam and oxygen at elevated pressures, e.g., from approximately 20 bar to 85 bar, and temperatures, e.g., approximately 700° C.-1600° C., depending on the type of gasifier utilized in the gasifier/cooler. In the depicted embodiment, the gasifier/cooler operates between about 400 pounds per square inch gauged (PSIG) and about 1200 PSIG (e.g., about 400, 500, 600, 700, 750, 800, 900, 1000, 1100, or 1200 PSIG). The gasification process may also include the feedstock undergoing a pyrolysis process, whereby the feedstock is heated. Temperatures inside the gasifier of the gasifier/cooler may range from approximately 150° C. to 700° C. during the pyrolysis process, depending on the fuel source 20 utilized to generate the feedstock. For example, the temperature may be about 150, 200, 250, 300, 350, 400, 450, 500, 550, 600, 650, or 700° C. The heating of the feedstock during the pyrolysis process may generate a solid, e.g., char, and residue gases, e.g., CO, $H_2$, and nitrogen ($N_2$). The char remaining from the feedstock after the pyrolysis process may weigh up to approximately 40% to 50% of the weight of the original feedstock (e.g., about 40, 41, 42, 43, 44, 45, 46, 47, 48, 49, or 50%).

A combustion process may then occur in the gasifier/cooler. To aid with this combustion process, a stream of oxygen 24 may be supplied to the gasifier/cooler from an air separation unit (ASU) 26. The ASU 26 may operate to separate air 28 into component gases by, for example, distillation techniques that may be cryogenic or may utilize pressure swing adsorption (PSA). For example, ASU 26 may separate the oxygen 24 from air 28 for delivery to the gasifier/cooler and nitrogen for collection or for further use in power generation, e.g., as a diluent gas or as blending gas.

Accordingly, the oxygen 24 is received by the gasifier/cooler from the ASU 26 for combustion purposes. The combustion may include introducing oxygen 24 to the char and residue gases so that the char and residue gases may react with the oxygen 24 to form $CO_2$ and CO, thus providing heat for the subsequent gasification reactions. The temperatures during the combustion process may range from approximately 700° C. to 1600° C. Next, steam may be introduced into the gasifier/cooler during a gasification step. The char may react with the $CO_2$ and steam to produce CO and $H_2$ at temperatures ranging from approximately 800° C. to 1100° C. In essence, the gasifier utilizes steam and oxygen to allow some of the feedstock to be combusted to produce $CO_2$ and energy, thus driving a main reaction that converts further feedstock to $H_2$ and additional CO.

Nevertheless, the gasifier/cooler produces a gaseous product. The gaseous product may include approximately 85% of CO and $H_2$, as well as $CO_2$, $CH_4$, $NH_3$, COS and $H_2S$ (based on the sulfur content of the feedstock), which in total may be considered a raw or untreated syngas 30. The gasifier/cooler may also generate waste, such as slag 32, which in some embodiments may be a wet ash material. The slag 32 may be removed from the gasifier/cooler by a scrubbing subsystem of the feedstock, gasification, and scrubbing system 22. The slag 32 may be disposed of, for example, as road base, or as another building material. Additionally, the scrubbing subsystem may clean the untreated syngas 30 by removing any particulate matter from the untreated syngas, such as the wet ash.

The stream of untreated syngas 30 may then be sent to a low temperature gas cooling (LTGC) unit 34, where the temperature of the untreated syngas 30 is lowered. In some embodiments, the untreated syngas 30 is cooled so that the AGR system 14 may more effectively treat the untreated syngas 30. For example, in embodiments where the untreated syngas 30 is cooled, gases such as $H_2S$ and $CO_2$ may have higher solubilities in the solvent(s) used to remove them from other syngas components (i.e., CO and H2). Thus, the stream of untreated syngas 30 is cooled by between approximately 10 and 500%. For example, the stream of untreated syngas 30 may be cooled by approximately 10, 50, 100, 200, 300, 400 or 500%, depending upon the specifications of particular implementations. The LTGC unit 34 may cool the untreated syngas 30 in a variety of processes, including heat exchange, gas expansion, and so forth. Accordingly, a stream of cooled untreated syngas 36 may be between ambient temperature (which may vary depending upon the location of the plant) and about 150° F. That is, the cooled untreated syngas 36 may have a temperature of approximately 50, 60, 65, 70, 75, 80, 85, 90, 95, 100, 105, 110, 115, 120, 130, 140, 150° F., or any temperature in between.

Subsequent to cooling, the stream of cooled untreated syngas 36 is sent to the acid gas removal (AGR) unit 14. The AGR unit 14 may scrub the cooled untreated syngas 36 to remove various gases and/or elements. For example, acid gases such as COS and $H_2S$ may be removed from the cooled untreated syngas 36 to generate a stream of treated syngas 38 (e.g., syngas substantially without sulfur). Additionally, the AGR unit 14 may transmit the removed gases and/or elements of the cooled untreated syngas 36 (e.g., the COS and $H_2S$) to a sulfur recovery unit (SRU) 40. In the illustrated embodiment, the AGR unit 14 may provide acid gas 42 to the SRU 40, which may separate sulfur 44 using, for example, a Claus reactor. In this manner, the sulfur 44 may be isolated for disposal or for sale. In some embodiments, after the stream of acid gas 42 is treated at the SRU 40, any remaining gases may be directed to a tail gas unit 46, where any remaining tail gas exhaust 47 may then be recycled to the feedstock, gasification and scrubbing system 22. Depending on the type of technology used by the SRU 40, the tail gas 47 may contain between approximately 2 and 5% $H_2S$, with the remainder being substantially $CO_2$ and $N_2$. Accordingly, in such embodiments, the tail gas 47 may optionally be directed to a $CO_2$ dehydration and compression unit 56, which is described below.

Substantially concurrently to the sulfur recovery process, the flash gas treatment column 12 may receive a stream of AGR flash gas 48 from the AGR unit 14. The AGR flash gas 48 may contain, among other gases, a mixture of $H_2S$ and $CO_2$ that have been removed from the cooled untreated syngas 36. For example, the AGR flash gas 48 may contain up to approximately 80% $CO_2$ (e.g., approximately 10, 20, 30, 40, 50, 60, 70, 75, or 80% $CO_2$). The flash gas treatment column 12 may allow a solvent to separate the $H_2S$ from the $CO_2$, and the $CO_2$ may be recycled back to a portion of the AGR unit 14 via $CO_2$ recycle stream 50. In some embodiments, by recycling $CO_2$ back to the AGR unit 14, higher levels of $CO_2$ capture along with decreased levels of $H_2S$ may be realized. Further, the flash gas treatment column 12 may serve to integrate the AGR unit 14 with the $CO_2$ capture unit 16. As noted above, in some situations, the flash gas treatment column 12 may be retrofitted into an existing system (such as system 10) in order to realize higher levels of $CO_2$ capture, higher levels of $CO_2$ purity, and/or to integrate the AGR unit 14 with a carbon capture section, such as the carbon capture unit 16. In other embodiments, the AGR flash gas 48 and/or the $CO_2$ recycle stream 50 may be directed back to the feedstock, gasification, and scrubbing system 22 or another plant area for internal uses. Further, the flash gas treatment column may optionally provide a stream of $CO_2$ 72 directly to the CO2 compression and dehydration unit 56. $CO_2$ recycle and capture are discussed in further detail below with respect to FIGS. 4-7.

Once the AGR flash gas 48 has been treated, the $CO_2$ capture unit 16 may remove a portion or substantially all of the $CO_2$ from the treated syngas 38 to produce product syngas 52. The product syngas 52 may have uses in chemical and/or power applications, as mentioned above. A portion of the $CO_2$ may be transmitted as a stream of $CO_2$ 54 from the $CO_2$ capture unit 16 to the $CO_2$ dehydration and compression unit 56. The $CO_2$ dehydration and compression unit 56 may dehydrate and compress the $CO_2$ 54 for storage and subsequent use. For instance, the total captured $CO_2$ 18 may be sent through a pipeline leading to one or more carbon sequestration sites, such as enhanced-oil recovery (EOR) sites or saline aquifers. Alternatively or additionally, the $CO_2$ dehydration and compression unit 56 may transmit the captured $CO_2$ 18 to, for example, a chemical plant for use therein. In one embodiment, the $CO_2$ capture unit 16 may remove up to approximately 95 percent (e.g., greater than about 1, 5, 10, 15, 20, 30, 40, 50, 55, 60, 65, 70, 75, 80, 85, 90, or 95%) of the $CO_2$ present within the treated syngas 38.

Figure 2:
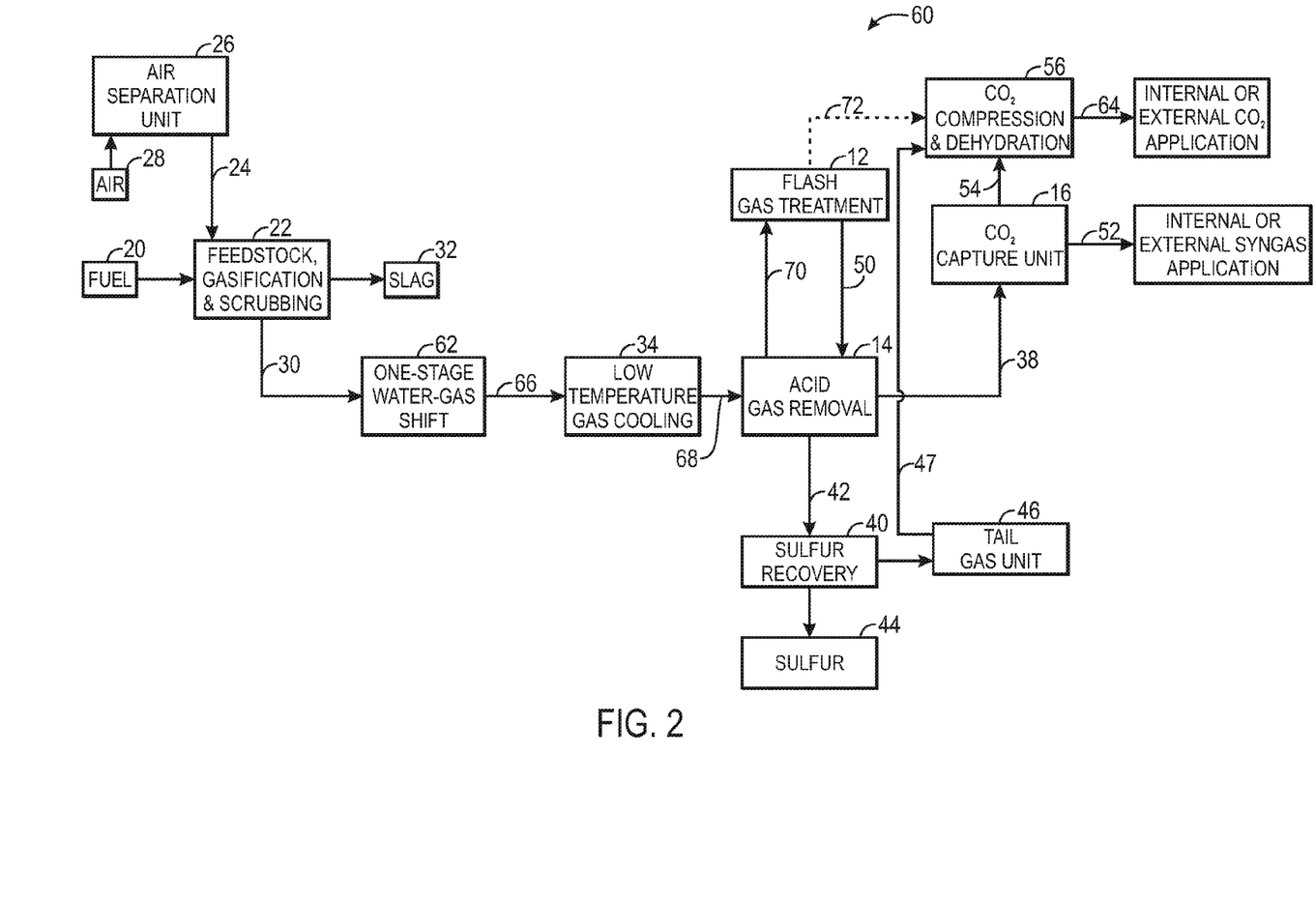
FIG. 2 is a block diagram of an embodiment of a gasification system utilizing a flash gas treatment column to integrate an AGR unit with a $CO_2$ removal unit.

The flash gas treatment column 12 may also be beneficial for removing $H_2S$ from captured $CO_2$ in systems having a higher level of carbon capture, such as a system employing one or more water-gas shift reactors. It should be noted that the flash gas treatment column 12 may be retrofitted into such as system, or may be included in the construction of the system. Accordingly, FIG. 2 is a block diagram of a system 60 that contains many similar features to that of the system 10 depicted in FIG. 1. However, in addition to the features described within FIG. 1, the system 60 includes a One-Stage Water-Gas Shift (WGS) reactor 62 downstream of the feedstock, gasification and scrubbing system 22 and upstream of the LTGC unit 34. In some embodiments, the WGS reactor 62 increases the amount of $CO_2$ present within the syngas flowing through the system 60 produced by the feedstock, gasification and scrubbing system 22 by adjusting the ratio of $CO_2$ to CO and $H_2$. Thus, a total amount of captured $CO_2$ 64 may be up to approximately 75% of the total carbonaceous gas. For example, the total amount of captured $CO_2$ may be approximately 5, 10, 15, 20, 25, 30, 35, 40, 45, 50, 55, 60, 65, 70, or 75%.

During the operation of system 60, the stream of untreated syngas 30 may be passed to the water-gas shift (WGS) reactor 62. The WGS reactor 62 may perform a WGS reaction in which a portion of the CO within the stream of untreated syngas 30 reacts with water (e.g. steam) to form $CO_2$ and $H_2$. The WGS process may adjust the ratio of $H_2$ to CO in the untreated syngas 30 from approximately 1 to 1 to approximately 3 to 1 for use in various processes, such as methanation. Additionally, the WGS reactor 62 may include a bypass that may be utilized to aid in proper control of the $H_2$ to CO ratio within a stream of untreated shifted syngas 66 that exits the WGS reactor 62. It should be noted that the WGS reactor 62 may be a sour WGS reactor, that is, sulfur may be present in the stream of untreated syngas 30 flowing into the WGS reactor 62 during the WGS reaction. Subsequent to the WGS reaction in the WGS reactor 62, the system 60 may transmit the stream of untreated shifted syngas 66 to the LTGC unit 34. As above in FIG. 1, the LTGC unit 34 cools the stream of untreated shifted syngas 66 by 10, 50, 100, 200, 300, 400 or 500%, depending upon the specifications of particular implementations. The LTGC unit 34 may cool the untreated shifted syngas 66 in a variety of processes, including heat exchange, gas expansion, and so forth. Accordingly, a stream of cooled untreated shifted syngas 68 may be between ambient temperature (which may vary depending upon the location of the plant) and about 150° F. That is, the cooled untreated syngas 66 may have a temperature of approximately 50, 60, 65, 70, 75, 80, 85, 90, 95, 100, 105, 110, 115, 120, 130, 140, 150° F., or any temperature in between.

Accordingly, the stream of cooled untreated shifted syngas 68 is provided to the AGR unit 14, where an AGR flash gas 70 containing a higher level of $CO_2$ than the AGR flash gas 48 of FIG. 1 is sent to the flash gas treatment column 12. For example, the AGR flash gas 70 may contain between approximately 50% and 90% $CO_2$ (e.g., approximately 50, 60, 70, 80, 85, or 90% $CO_2$). As noted above in FIG. 1, the flash gas treatment column 12 directs the $CO_2$ recycle stream 50 back to a portion of the AGR unit 14. Additionally and/or alternatively, the stream of $CO_2$ 72 may be sent directly to the $CO_2$ dehydration and compression unit 56, rather than back through the AGR unit 14 and the $CO_2$ capture unit 16. The optional $CO_2$ stream 72 is discussed in further detail with respect to FIGS. 6-7 below.

As above, the $CO_2$ capture unit 16 may direct the $CO_2$ stream 54 to the $CO_2$ compression and dehydration unit 56. It should be noted that the captured $CO_2$ 64 may have the same or higher concentration of $CO_2$ than the captured $CO_2$ 18, depending upon the presence of other trace gases (e.g., $H_2S$, CO, $H_2$). However, the configuration of system 60 may allow the magnitude of captured $CO_2$ 64 to be greater than the magnitude of captured $CO_2$ 18 in system 10, as measured by amount of $CO_2$ over time.

Figure 3:
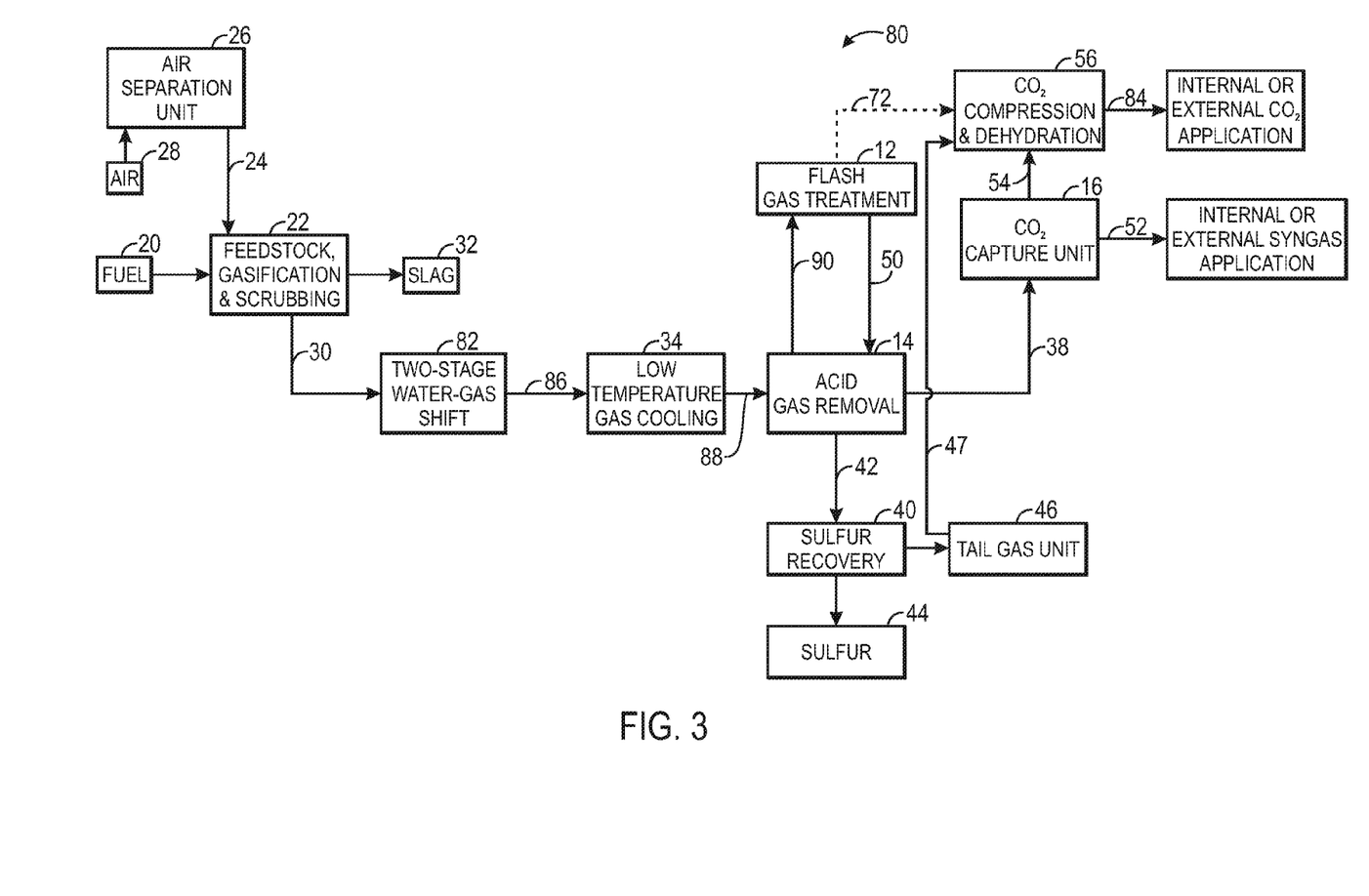
FIG. 3 is a block diagram of an embodiment of a gasification system utilizing a flash gas treatment column to integrate an AGR unit with a $CO_2$ removal unit.

FIG. 3 is a block diagram of an embodiment of a gasification system 80. The gasification system 80, like the system 60 of FIG. 2, increases the level of $CO_2$ capture that is possible by performing WGS reactions. However, the system 80 includes a Two-Stage Water-Gas shift reactor 82 that allows a level of captured $CO_2$ 84 of up to approximately 95% of the carbonaceous gas. For example, the captured $CO_2$ 84 may be between approximately 0 and 95% (e.g., approximately 1, 5, 10, 20, 30, 40, 50, 60, 70, 80, 90, or 95%) of the carbonaceous gas flowing through the system 80.

Therefore, the stream of untreated syngas 30 that is produced by the feedstock, gasification and scrubbing system 22 is directed to the Two-Stage WGS reactor 82, where an initial portion of the CO in the untreated syngas 30 is converted, along with $H_2O$, to a first portion of $CO_2$ and $H_2$ in a first stage of WGS reaction. Thereafter, another portion (a portion of what is not converted in the first stage of WGS reaction) of the CO in the untreated syngas 30 is converted, along with $H_2O$, to more $CO_2$ and $H_2$. In this way, high levels of $CO_2$ in the syngas flowing through the system 80 may be obtained. Accordingly, a stream of untreated shifted syngas 86 having a higher $CO_2$ content than the syngas streams 66 and 30 is directed to the LTGC unit 34.

As above in FIGS. 1 and 2, the LTGC unit 34 cools the stream of untreated shifted syngas 86 by 10, 50, 100, 200, 300, 400 or 500%, depending upon the specifications of particular implementations. The LTGC unit 34 may cool the untreated shifted syngas 86 in a variety of processes, including heat exchange, gas expansion, and so forth. Accordingly, a stream of cooled untreated shifted syngas 88 may be between ambient temperature (which may vary depending upon the location of the plant) and about 150° F. That is, the cooled untreated syngas 86 may have a temperature of approximately 50, 60, 65, 70, 75, 80, 85, 90, 95, 100, 105, 110, 115, 120, 130, 140, 150° F., or any temperature in between.

Accordingly, the stream of cooled untreated shifted syngas 88 is provided to the AGR unit 14, where an AGR flash gas 90 containing a higher level of $CO_2$ than the AGR flash gas 48 and 68 of FIGS. 1 and 2, respectively, is sent to the flash gas treatment column 12. For example, the AGR flash gas 90 may contain between approximately 50% and 95% $CO_2$ (e.g., approximately 50, 60, 70, 80, 85, 90, or 95% $CO_2$). As noted above in FIGS. 1 and 2, the flash gas treatment column 12 directs the $CO_2$ recycle stream 50 back to a portion of the AGR unit 14. Additionally and/or alternatively, the stream of $CO_2$ 72 may be sent directly to the $CO_2$ dehydration and compression unit 56, rather than back through the AGR unit 14 and the $CO_2$ capture unit 16.

The $CO_2$ capture unit 16 may direct the $CO_2$ stream 54 to the $CO_2$ compression and dehydration unit 56. As with the system 60 in FIG. 2, it should be noted that the captured $CO_2$ 84 may have the same or higher concentration of $CO_2$ than the captured $CO_2$ 18 and 64, depending upon the presence of other trace gases (e.g., $H_2S$, CO, $H_2$). The configuration of system 80 may allow the magnitude of captured $CO_2$ 84 to be greater than the magnitude of captured $CO_2$ in systems 10 and 60, as measured by amount of $CO_2$ over time.

Figure 4:
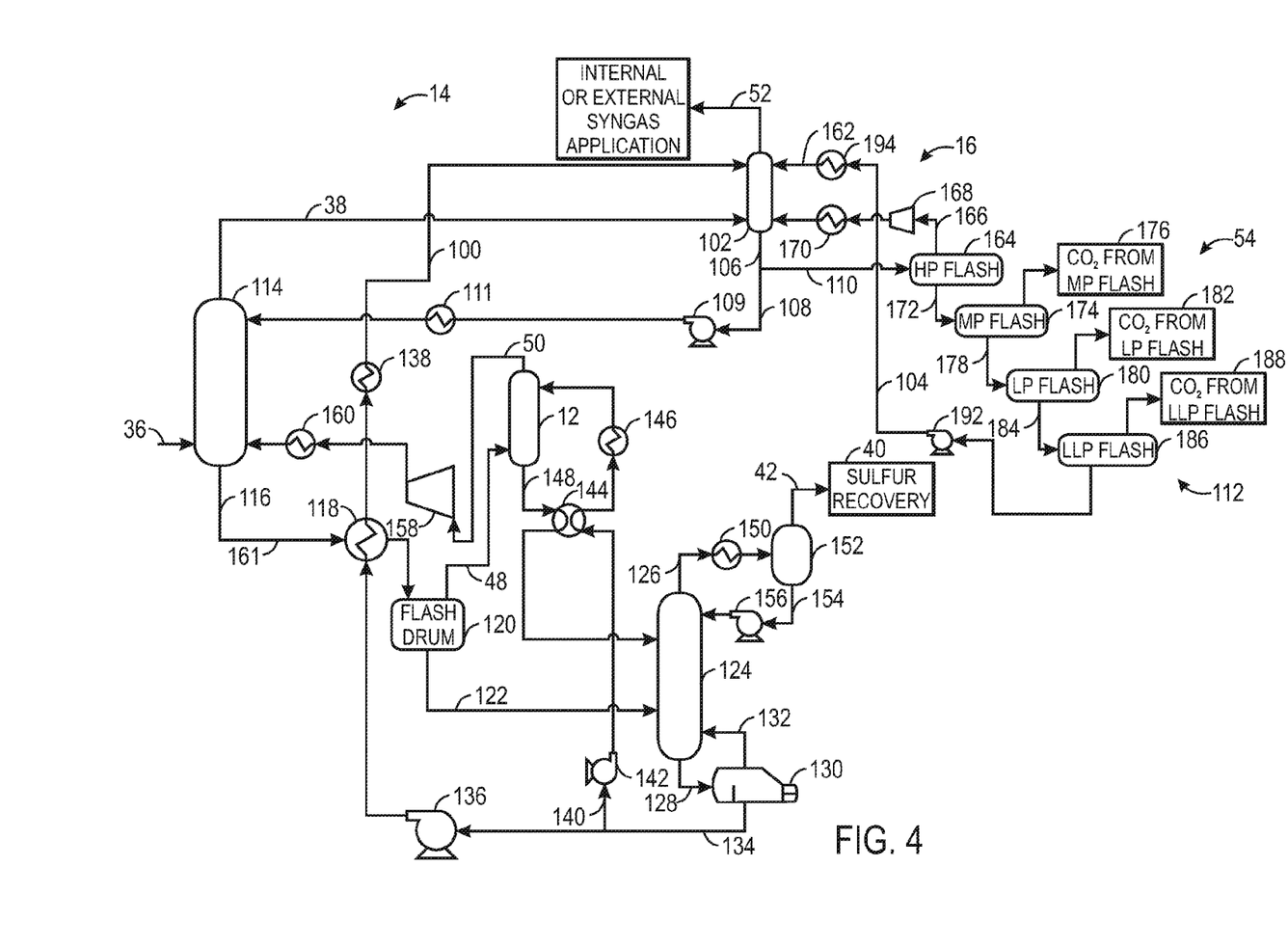
FIG. 4 is a diagrammatical illustration of an embodiment of the flash gas treatment column of FIGS. 1-3 utilized to integrate an AGR unit with a $CO_2$ removal unit.

FIG. 4 is a diagrammatic illustration of an embodiment of the AGR unit 14 integrated with the $CO_2$ capture unit 16 using the flash gas treatment column 12. In a general sense, the AGR unit 14 is configured to produce the treated syngas 38 having a minimal concentration of sulfur. For example, the treated syngas 38 may have less than approximately 20 parts per million (ppm) total sulfur. The carbon capture unit 16 is generally configured to remove a substantial amount of $CO_2$ from the treated syngas 38, resulting in the product syngas 52 and the captured $CO_2$ 18. It should be noted that while the present discussion references elements from system 10 of FIG. 1, such as treated syngas 38 and untreated syngas 36, that the embodiments described herein are also applicable to systems 60 and 80 of FIGS. 2 and 3. Thus, untreated syngas 36 may be cooled untreated shifted syngas 68 or cooled untreated shifted syngas 88, and so on.

In the illustrated embodiment, the AGR unit 14 produces treated syngas 38 as well as a stream of $CO_2$-lean $H_2S$-lean (gas-lean) solvent 100, both of which are directed to a $CO_2$ absorber 102 within the $CO_2$ capture unit 16. The $CO_2$ absorber 102 allows a countercurrent flow between the stream of treated syngas 38, which enters a lower portion of the $CO_2$ absorber 102, and a mixture of the gas-lean solvent 100 and a stream of recycled solvent 104. As the solvents 100 and 104 mix with the stream of treated syngas 38, a substantial portion of the $CO_2$ within the treated syngas 38 is extracted, resulting in a stream of $CO_2$-rich solvent 106 and the product syngas 52. As noted above with respect to FIGS. 1-3, between approximately 50 and 100% of the $CO_2$ is removed from the treated syngas 38 to give the product syngas 52.

The stream of $CO_2$-rich solvent 106 then diverges into a first divergent path 108 to the AGR unit 14 and a second divergent path 110 to a plurality of flash tanks 112. Specifically, a solvent pump 109 increases the flow rate of the $CO_2$-rich solvent within the first divergent path 108, and a solvent chiller 111 decreases its temperature. The $CO_2$-rich solvent within the first divergent path 108 is then sent to an upper portion of an $H_2S$ Absorber 114. The stream of untreated syngas 36 also enters the $H_2S$ Absorber 114, but at a lower portion. Therefore, the upward-rising untreated syngas 36 mixes with the downward-flowing $CO_2$-rich solvent flowing through the first divergent path 108 via a countercurrent in the $H_2S$ absorber 114. The $CO_2$-rich solvent removes substantially all of the $H_2S$ present within the untreated syngas 36, such that the treated syngas 38 that exits an upper portion of the $H_2S$ Absorber 114 has no more than approximately 20 ppm total sulfur.

Accordingly, a stream of $CO_2$-rich and $H_2S$-rich solvent 116 exits a lower portion of the $H_2S$ Absorber 114. The stream of $CO_2$-rich and $H_2S$-rich solvent 116 is then warmed in a heat exchanger 118, and then directed to a flash drum 120. According to the present embodiments, the flash drum 120 may have a pressure lower than the $H_2S$ Absorber 114. For example, in embodiments where the $H_2S$ Absorber 114 is at between approximately 600 and 400 pounds per square inch (psi), the flash drum 120 may be at between approximately 250 and 200 psi. It should be noted that the exact pressure of the $H_2S$ Absorber 114 and the flash drum 120 may vary, and that other pressures are also contemplated. For example, the $H_2S$ Absorber 114 may be at the same or slightly lower pressure than the gasifier in the feedstock, gasification and scrubbing system 22, and the pressure difference may be that which results from a loss of pressure due to gas flow. Accordingly, in terms of the AGR unit 14, the $H_2S$ Absorber 114 may be considered to be at a high pressure, with the flash drum 120 being at an intermediate pressure.

Nevertheless, the flash drum 120 is configured to perform a flash event on the stream of $CO_2$-rich and $H_2S$-rich solvent 116. The flash event results in the stream of AGR flash gas 48 being sent to the flash gas treatment column 12 and a stream of $CO_2$-rich and $H_2S$-rich solvent 122 being sent to an area of solvent recycle. It should be noted that the solvent within the stream of $CO_2$-rich and $H_2S$-rich solvent 122 might have a lower amount of entrained $CO_2$ and $H_2S$ than the stream of $CO_2$-rich and $H_2S$-rich solvent 116. However, due to the pressure drop experienced in the flash drum 120, the stream 122 is still rich in $H_2S$ and $CO_2$. The stream of $CO_2$-rich and $H_2S$-rich solvent 122 is then directed to a solvent stripper 124, which is essentially a flash vessel at a low pressure (lower than the flash drum 120 and the $H_2S$ Absorber 114). For example, the solvent stripper 124 may have a pressure between approximately 20 and 50 psi (e.g., approximately 20, 30, 40, 45, or 50 psi). The solvent stripper 124 is configured to lower the pressure of the stream of $CO_2$-rich and $H_2S$-rich solvent 122, such that it experiences a flash event. Accordingly, the gaseous portion of the stream 122 exits an upper portion of the solvent stripper 124 into a path 126. A concomitant stream of $CO_2$-lean and $H_2S$-lean solvent 128 exits a lower portion of the solvent stripper 124 and is directed to a stripper reboiler 130. The stripper reboiler 130 may be at the same or slightly lower pressure of the solvent stripper 124, and is configured to flash the stream of $CO_2$-lean and $H_2S$-lean solvent 128, such that any residual entrained $H_2S$ and/or $CO_2$ is directed back to the solvent stripper 124 via path 132.

Therefore, a stream of gas-lean solvent 134 exits the stripper reboiler 130, where a solvent recirculation pump 136 increases its flow rate. It should be noted that the solvent stripper 124 and/or the stripper reboiler 130 may be at an elevated temperature. Accordingly, the stream of gas-lean solvent 134 may be warmed upon exiting the stripper reboiler 130. In some embodiments, $CO_2$ and/or $H_2S$ may have a higher solubility in cooled solvent. Accordingly, the stream of lean solvent 134 is cooled in the heat exchanger 118 that is used to warm the stream of $CO_2$-rich and $H_2S$-rich solvent 116. At this point, the stream of lean solvent 134 may be approximately room temperature (depending upon the temperature of the plant). The stream of gas-lean solvent 134 is then sent through a chiller 138 to generate the stream of lean solvent 100 that is directed to the $CO_2$ absorber 102.

In addition to the pathway leading to the $CO_2$ absorber 102, the stream of gas-lean solvent 134 may split into a divergent stream of gas-lean solvent 140. A pump 142 increases the flow velocity of the divergent stream of gas-lean solvent 140, which is then directed to a heat exchanger 144 to be cooled to approximately room temperature. The divergent stream of gas-lean solvent 140 is then cooled in a solvent chiller 146, where it then enters into an upper portion of the flash gas treatment column 12. Accordingly, the chilled, downward-flowing lean solvent from the stream 140 mixes with the upward-rising AGR flash gas 48 via a countercurrent. In one embodiment, by using a chilled solvent, the solvent is able to extract mainly $H_2S$ from the AGR flash gas 48, in effect separating the $H_2S$ from the $CO_2$. Additionally, the intermediate operating pressure of the flash gas treatment column 12, which is less than the flash drum 120 but higher than the solvent stripper 124 (e.g., between approximately 100 and 200 psi), allows most of the $CO_2$ of the AGR flash gas 48 to remain unabsorbed by the downward-flowing chilled solvent from stream 140. In some embodiments, the pressure of the flash gas treatment column may vary, depending upon the operating conditions of the gasification plant. Therefore, the pressure of the flash gas treatment column 12 may range between approximately 100 and 400 psi. The pressure may be 100, 125, 150, 175, 200, 250, 300, 350, or 400 psi.

As noted above, in some embodiments the downward-flowing solvent from the stream 140 may entrain the $H_2S$ from the AGR flash gas 48, producing a stream of $H_2S$-rich solvent 148 that exits a lower portion of the flash gas treatment column 12. The stream of $H_2S$-rich solvent 148 is then directed to the solvent heat exchanger 144 that is used to cool the stream of lean solvent 140. Thus, heat is transferred from the solvent 140 to the solvent 148 in the solvent heat exchanger 144. The warmed stream of $H_2S$-rich solvent 148 is then sent to the solvent stripper 124, where most of the entrained $H_2S$ is removed in a flash event. The gaseous stream 126 output by the solvent stripper 124 may therefore contain mainly $H_2S$ with a small portion of $CO_2$. The gaseous stream 126 is then cooled in a cooler 150, where it is then directed to a knockout drum 152. The knockout drum 152 may be an area of reduced pressure lower than that of the solvent stripper 124, where residual condensed solvent 154 is separated from the acid gas 42, which may contain up to approximately 85% $CO_2$ and/or up to approximately 60% $H_2S$. For example, the acid gas 42 may contain approximately 1, 5, 10, 15, 20, 30, 40, 50, 60, 70, 80, or 85% $CO_2$ and approximately 1, 5, 10, 15, 20, 30, 40, 50, 60, or 65% $H_2S$. A pump 156 increases the flow rate of the residual condensed solvent stream 154, which is directed to an upper portion of the solvent stripper 124 for recycle.

In one aspect according to present embodiments, the $CO_2$ that exits the flash gas treatment column 12 may be the $CO_2$ recycle stream 50 that is sent to the $H_2S$ Absorber 114. The $CO_2$ recycle stream 50, which contains mainly $CO_2$ with a trace amount of $H_2S$, may be compressed in a compressor 158. For example, the $CO_2$ recycle stream 50 may be compressed to a pressure that is slightly less or substantially equal to that of the $H_2S$ absorber 114. The compressed $CO_2$ recycle stream 50 is then cooled in a recycle cooler 160 and is then directed to a lower portion of the $H_2S$ absorber 114. In doing so, the present embodiments provide for a higher concentration of $CO_2$ within the $H_2S$ absorber 114 than would be obtained without the flash gas treatment column 12. That is, the flash gas treatment column 12 allows the levels of $CO_2$ within the $H_2S$ absorber 114 to be increased, such that the treated syngas 38 so produced contains mainly $CO_2$ and syngas. Additionally, the flash gas treatment column 12 effectively decreases the concentration of trace $H_2S$ sent to the $CO_2$ capture section 16, as well as the levels of $H_2S$ flowing through the AGR unit 14. Further, it should be noted that a fluid path 161 may connect, in a sequential manner, the $H_2S$ absorber 114, the flash drum 120, the flash gas treatment column 12, the $H_2S$ absorber 114, and the $CO_2$ absorber 102. Therefore, the fluid path 161 may contain both liquid/gas paths, liquid streams, gas streams, and so forth. For example, fluid path 161 may include, among other paths and vessels, the $CO_2$-rich $H_2S$-rich solvent stream 116, the AGR flash gas stream 48, the $CO_2$ recycle stream 50, and the treated syngas stream 38. The fluid path 161 may also include the stream of $CO_2$-rich solvent 106 and its divergent paths.

According to the present embodiments, the stream of treated syngas 38 may have a concentration of $CO_2$ that has been increased by the flash gas treatment column 12 to levels up to between approximately 15 and 35% or more, depending on the configuration of the gasification plant. For example, the stream of treated syngas 38 may contain approximately 15, 20, 25, 30, or 35% $CO_2$ or more. That is, the stream of treated syngas 38 may contain more $CO_2$ than a system without the flash gas treatment column 12. Thus, the treated syngas 38 may be considered to be $CO_2$-concentrated, $CO_2$-loaded, $CO_2$-rich, and so forth. As noted above, the stream of treated syngas 38 is directed to the $CO_2$ absorber 102, where up to approximately 95% of the $CO_2$ is separated from the syngas by a downward-flowing solvent. As can be appreciated from the illustration of FIG. 4, the $CO_2$ absorber 102 may utilize more than one solvent source. That is, the $CO_2$ absorber 102 of FIG. 4 utilizes the lean solvent stream 100 and a chilled recycle stream 162 to produce the stream of $CO_2$-rich solvent 106. Further, as noted above, the stream of $CO_2$-rich solvent 106 splits into the first divergent path 108 and the second divergent path 110. The second divergent path 110 leads to the plurality of flash drums 112 containing a series of flash drums sequentially flowing from high to lower pressures.

More specifically, the second divergent path 110 leads to a high pressure flasher 164 of slightly lower pressure than the $CO_2$ absorber 102, where any remaining entrained syngas is removed from the $CO_2$-rich solvent. Additionally, a portion of the solvent, $CO_2$ and/or $H_2S$ may flash as well, producing a recycle gas stream 166. A recycle compressor 168 compresses the recycle gas stream 166 to a slightly lower or substantially equal pressure of the $CO_2$ absorber 102. A cooler 170 then cools the compressed recycle gas stream 166 to a temperature where any solvent vapor condenses and the gaseous components remain as gas. The cooled and compressed recycle gas stream 166 is then provided to a lower portion of the $CO_2$ absorber 102.

In addition to the recycle gas stream 166, the flash event within the high pressure flasher 164 produces a stream of $CO_2$-loaded solvent 172 that exits a lower portion of the high pressure flasher 164. The high pressure flasher 164 may be at a pressure that is similar to that of the flash drum 120. For example, the high pressure flasher 164 may have a pressure lower than the $H_2S$ absorber 114 but higher than the solvent stripper 124. As an example, the high pressure flasher 164 may have a pressure of between approximately 375 and 100 psi (e.g., approximately 100, 125, 150, 175, 200, 225, 250, 275, 300, 325, 350, or 375 psi).

The $CO_2$-loaded solvent 172 then enters a medium pressure flasher 174 having a lower pressure than the high pressure flasher 164 but higher than the solvent stripper 124, where a portion of $CO_2$ is removed in a flash event to produce a medium pressure $CO_2$ product 176. Accordingly, the medium pressure flasher 174 may have a pressure between approximately 300 and 75 psi (e.g., 75, 100, 125, 150, 175, 200, 225, 250, 275 or 300 psi). Additionally, the flash event within the medium pressure flasher 174 produces a stream of $CO_2$-rich solvent 178, which is then directed to a low pressure flasher 180. Within the low pressure flasher 180, the stream of $CO_2$-rich solvent 178 undergoes a flash event, producing a low pressure $CO_2$ product 182 and a stream of $CO_2$-entrained solvent 184. Finally, the stream of $CO_2$-entrained solvent 184 is directed to an ultra-low pressure flasher 186, where a remaining portion of $CO_2$ 188 is removed in a flash event. As above, the flash event also produces a stream of solvent 190 that is lean in $CO_2$ and lean in $H_2S$ (gas-lean). The medium pressure $CO_2$ product 176, the low pressure $CO_2$ product 182, and the remaining $CO_2$ product 188 may be combined and directed to the $CO_2$ compression and dehydration unit 56 (FIGS. 1-3) as the $CO_2$ stream 54. In the embodiments described herein, total sulfur levels within the $CO_2$ stream 54 may be between approximately 3000 ppm and 10 ppm, depending on the configuration of the gasification plant and the total sulfur content of the feed 12 (FIG. 1). The $CO_2$ stream 54, as noted above with respect to FIGS. 1-3, may then be dehydrated and/or compressed to give the total captured $CO_2$ 18 (FIGS. 1-3). Therefore, the total sulfur levels within the total captured $CO_2$ 18 (FIGS. 1-3) may be approximately 1, 5, 10, 15, 20, 25, 30, 50, 100, 200, 300, 400, 500, 600, 700, 800, 900, 1000, 1500, 2000, 2500, or 3000 ppm, or any range in between.

As noted above, the flash event within the ultra-low pressure flasher 186 also produces the gas lean stream of solvent 190. A solvent recirculation pump 192 then increases the flow rate of the gas-lean solvent stream 190, and it is then directed to a chiller 194. The chiller 194 cools the gas-lean solvent stream 190 to generate the cooled recycle solvent stream 162 that enters an upper portion of the $CO_2$ absorber 102.

Figure 5:
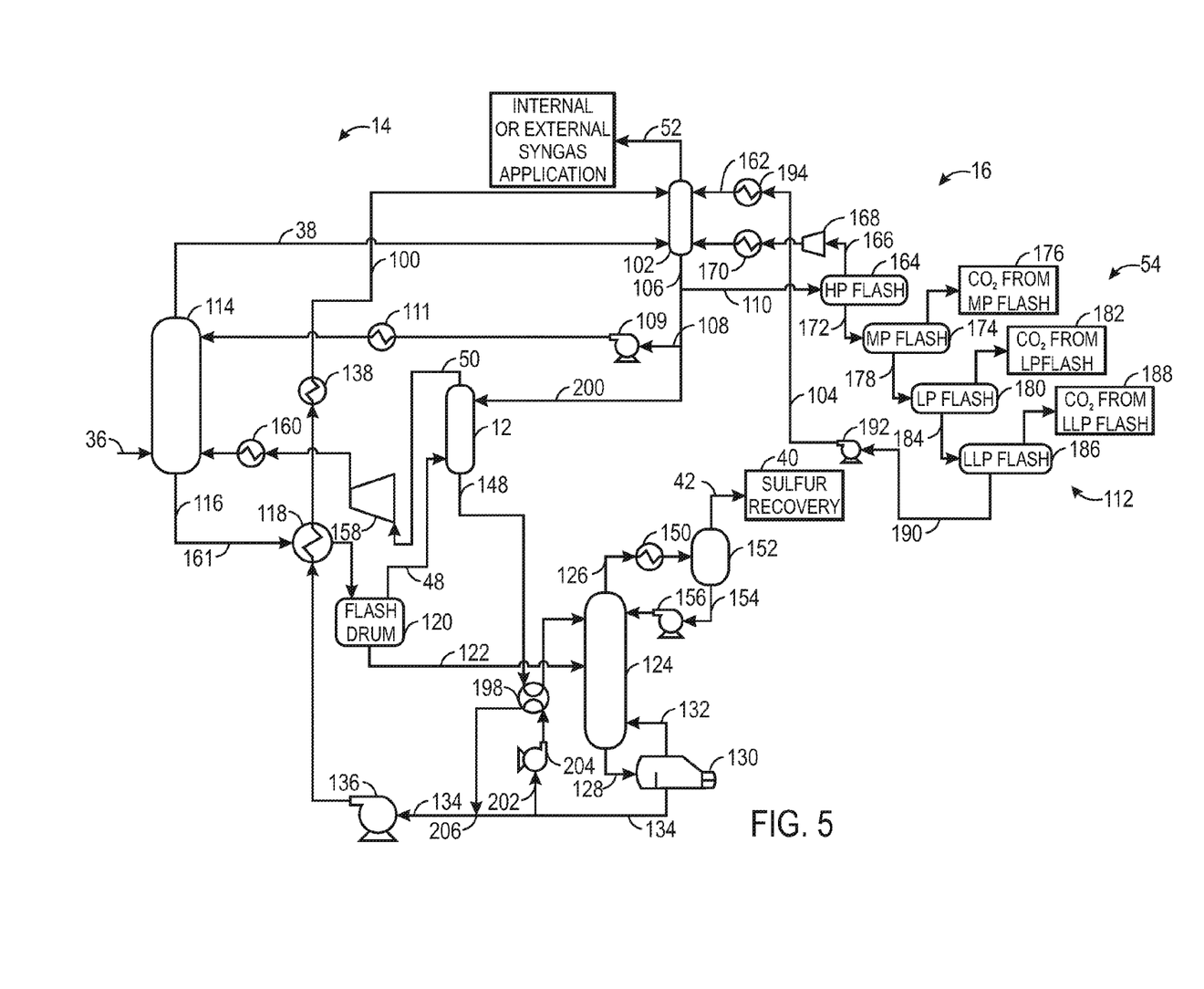
FIG. 5 is a diagrammatical illustration of another embodiment of the flash gas treatment column of FIGS. 1-3 utilized to integrate an AGR unit with a $CO_2$ removal unit.

FIG. 5 is a diagrammatic illustration of another embodiment of the AGR unit 14 integrated with the $CO_2$ capture unit 16 using the flash gas treatment column 12. The diagrammatic illustration of FIG. 5 contains similar or the same elements as depicted in FIG. 4. Further, the flow scheme of FIG. 5 is similar to that of FIG. 4. Accordingly, similar features are discussed using the same reference numerals. Additionally, the embodiment of FIG. 5 differs from that of FIG. 4 by the manner in which the flash gas treatment column 12 interfaces with the AGR unit 14 and the $CO_2$ capture unit 16. As such, the discussion of FIG. 5 will be directed towards the features not present within FIG. 4.

In the illustrated embodiment of FIG. 5, the flash gas treatment column 12 uses a split portion of $CO_2$-loaded solvent 200 from the $CO_2$ absorber 102 rather than the gas-lean solvent 140 as shown in FIG. 4. The stream of $CO_2$-loaded solvent 200 may be considered to be a third divergent path from the stream of $CO_2$-rich solvent 106 exiting the $CO_2$ absorber 102. In this way, the lean solvent chiller 146 may be reduced or eliminated, as the solvent source of the stream of $CO_2$-rich solvent 106 (the recycle solvent 162) is cooled or chilled at the chiller 194. Therefore, the temperature of the $CO_2$-loaded solvent 200 may be suitable for use in the flash gas treatment column 12 without further solvent chilling prior to delivery.

According to present embodiments, the downward-flowing $CO_2$-loaded solvent 200 mixes with the upward rising AGR flash gas 48. In one embodiment, the $CO_2$-loaded solvent 200 may not remove any $CO_2$ from the AGR flash gas 48, as the cooled or chilled solvent may already be fully saturated with $CO_2$. Thus, the acid gas 42 that leaves at the head (upper portion) of the solvent stripper 124 may not be substantially affected, which may be advantageous for certain sulfur recovery processes, such as those performed in a Claus reactor. Further, by using the cooled or chilled $CO_2$-loaded solvent 200, the flow rate sufficient to treat normal operating gas volumes may be reduced. That is, lower flow rates of the cooled or chilled $CO_2$-loaded solvent 200 may be used to treat an amount of gas equal to that of a warm or hot solvent flowing at higher rates. For example, the flow rate may be reduced by between approximately 10 and 1000%, such as by approximately 10, 20, 30, 40, 50, 60, 70, 80, 90, 100, 200, 300, 400, 500, 600, 700, 800, 900, or 1000% or more relative to warm or hot solvent flow rates. Alternatively or additionally, the size of the flash gas treatment column 12 may be reduced, due at least in part to lower flow rates and/or higher $H_2S$ absorbance efficiency. The operational size of the flash gas treatment column 12 may depend on various factors, including the operational pressure, the flow rates of the solvents employed, the volume of gas to be treated, and so on.

The stream of $H_2S$-rich $CO_2$-rich solvent 148 that exits a lower portion of the flash gas treatment column 12 is then warmed in a heat exchanger 198. The warmed $H_2S$-rich $CO_2$-rich solvent 148 is then provided to the solvent stripper 124 where it undergoes a flash event to produce the gaseous stream 126 and the stream of gas-lean solvent 134. As noted above with respect to FIG. 4, the flow rate of the stream of gas-lean solvent 134 is increased by the pump 136. Additionally, the stream of gas-lean solvent 134 is cooled at the solvent heat exchanger 118 and chilled at the solvent chiller 138 to generate the stream of lean solvent 100 that is delivered to the $CO_2$ absorber 102.

In the illustrated embodiment, the stream of gas-lean solvent 134 splits into a divergent path 202. The flow rate of the gas-lean solvent within path 202 is then increased by a solvent pump 204, where it is directed to the heat exchanger 198 that warms the stream of $H_2S$-rich $CO_2$-rich solvent 148. Again, the heat exchanger 198 transfers heat from the solvent in path 202 to the solvent 148. Unlike the divergent path 140 depicted in the embodiment of FIG. 4, the gas-lean solvent in the divergent path 202 is not used as an input to the flash gas treatment column 12. Rather, the gas-lean solvent in the divergent path 202 re-combines with the gas-lean solvent stream 134 at a junction 206. Therefore, the divergent path 202 is generally configured to act as a heat transfer medium for heating the stream of $H_2S$-rich $CO_2$-rich solvent 148 in the heat exchanger 198.

In some situations, it may be desirable to send the $CO_2$ that is separated out of the AGR flash gas 48 to a portion of the gasification plant other than the $H_2S$ absorber 114. For example, it may be desirable to send the separated $CO_2$ directly to the $CO_2$ capture unit 16. As noted above with respect to FIGS. 1-3, in further embodiments, such as when the separated $CO_2$ is substantially free of $H_{2S}$ (e.g., less than 20 ppm), it may be desirable to send the stream of $CO_2$ 72 directly to the $CO_2$ compression and dehydration unit 56.

Figure 6:
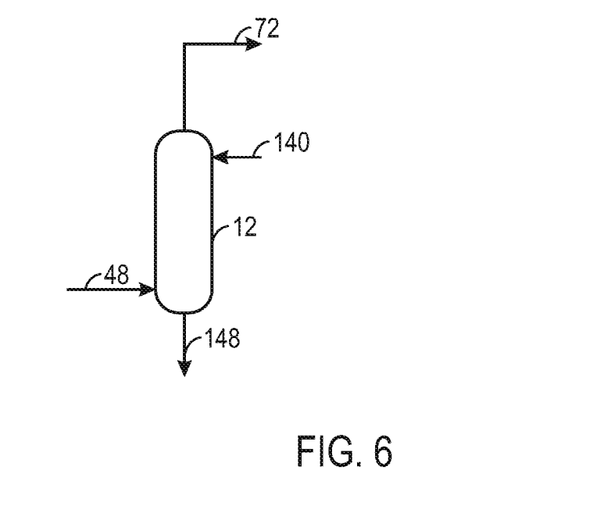
FIG. 6 is a diagrammatical illustration of an embodiment of an alternative flow scheme of the flash gas treatment column of FIG. 4.

FIG. 6 is a diagrammatical illustration of an embodiment of the flash gas treatment column 12 configured to send the $CO_2$ stream 72 directly to the $CO_2$ compression and dehydration unit 56 (FIGS. 1-3). More specifically, FIG. 6 is an embodiment utilizing a similar flow scheme to that shown in FIG. 4, albeit sending the $CO_2$ exiting the flash gas treatment column 12 to the $CO_2$ compression and dehydration unit 56 (FIGS. 1-3) rather than the $H_2S$ Absorber 114. In the illustrated embodiment, the AGR flash gas 48 enters the flash gas treatment column 12 at a bottom portion. The chilled gas-lean solvent 140 enters the flash gas treatment column 12 at an upper portion. According to present embodiments, the upward-flowing AGR flash gas 48 mixes via a countercurrent with the downward-flowing chilled gas-lean solvent 140. The gas-lean solvent 140 extracts substantially all of the $H_2S$ and some $CO_2$ from the AGR flash gas 48 to generate a stream of $CO_2$-rich $H_2S$-rich solvent 148, which is directed to the solvent stripper 124 depicted in FIGS. 4 and 5. In the embodiment depicted, the $CO_2$ 72 exiting the flash gas treatment column 12 may be of suitable purity for use as a $CO_2$ product stream that may be exported for energy or chemical use. For example, the $CO_2$ may be between approximately 90 and 100% pure, such as at least approximately 90, 91, 92, 93, 94, 95, 96, 97, 98, 99, 99.5, 99.9, 99.995, or 99.999% or more pure. In one embodiment, the $CO_2$ stream 72 may be substantially all gaseous $CO_2$, such that the $CO_2$ stream 72 may be suitable for compression without undergoing a flash event. Therefore, the $CO_2$ stream 72 may avoid being sent to another flasher, such as the plurality of flashers 112 and may instead be sent directly to the $CO_2$ compression and dehydration unit 56 (FIGS. 1-3). In other embodiments, it may be desirable to send a first portion of the $CO_2$ exiting the flash gas treatment column 12 to the $CO_2$ compression and dehydration unit 56 while sending a second portion of the $CO_2$ exiting the flash gas treatment column 12 back to the $H_2S$ Absorber of FIGS. 4 and 5.

Figure 7:
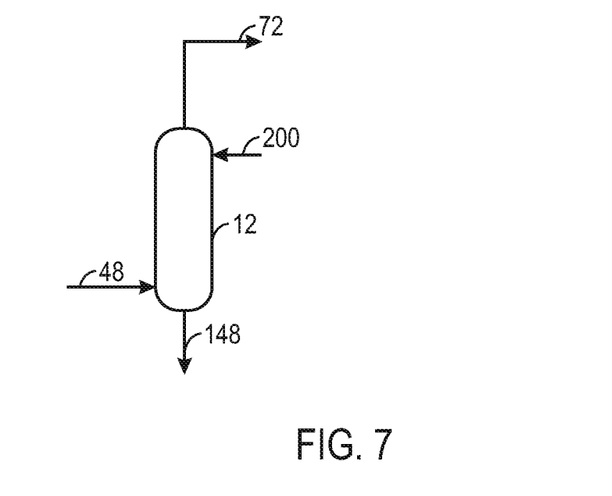
FIG. 7 is a diagrammatical illustration of an embodiment of an alternative flow scheme of the flash gas treatment column of FIG. 5.

FIG. 7 is a diagrammatical illustration of an embodiment of the flash gas treatment column 12 configured to send the $CO_2$ stream 72 directly to the $CO_2$ compression and dehydration unit 56 (FIGS. 1-3). The embodiment depicted in FIG. 7 utilizes a similar flow scheme to that shown in FIG. 5. However, rather than send the $CO_2$ exiting the flash gas treatment column 12 to the $H_2S$ absorber 114, the embodiment of FIG. 7 directs the stream of $CO_2$ 72 directly to the $CO_2$ compression and dehydration unit 56 (FIGS. 1-3). In the illustrated embodiment, the AGR flash gas 48 enters the flash gas treatment column 12 at a bottom portion. The chilled $CO_2$-rich solvent stream 200 from the $CO_2$ absorber 102 (FIGS. 4 and 5) enters the flash gas treatment column 12 at an upper portion. According to present embodiments, the upward-flowing AGR flash gas 48 mixes via a countercurrent with the downward-flowing chilled $CO_2$-rich solvent 200. The chilled $CO_2$-rich solvent 200 extracts substantially all of the $H_2S$ and substantially no $CO_2$ from the AGR flash gas 48 to generate a stream of $CO_2$-rich $H_2S$-rich solvent 148, which is directed to the solvent stripper depicted in FIGS. 4 and 5. In the embodiment depicted, the $CO_2$ exiting the flash gas treatment column 12 may contain less than approximately 300 ppm sulfur (e.g., $H_2S$ and COS). Accordingly, the $CO_2$ stream 72 may contain less than approximately 1, 5, 10, 20, 50, 100, 200, or 300 ppm total sulfur. As such, the $CO_2$ stream 72 may be of suitable purity for use as a $CO_2$ product stream that may be exported for energy or chemical use. For example, the $CO_2$ stream 72 may have substantially the same or more purity than that described above with respect to FIG. 6. In one embodiment, the $CO_2$ stream 72 may be substantially all gaseous $CO_2$, such that the $CO_2$ stream 72 may be suitable for compression without undergoing a flash event. Therefore, the $CO_2$ stream 72 may avoid being sent to another flasher, such as the plurality of flashers 112 and may instead be sent directly to the $CO_2$ compression and dehydration unit 56 (FIGS. 1-3). In other embodiments, it may be desirable to send a first portion of the $CO_2$ exiting the flash gas treatment column 12 to the $CO_2$ compression and dehydration unit 56 while sending a second portion of the $CO_2$ exiting the flash gas treatment column 12 back to the $H_2S$ Absorber 114 of FIGS. 4 and 5.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a hydrogen sulfide ($H_2S$) absorber;
   a first flash tank;
   a flash gas treatment column;
   a carbon dioxide ($CO_2$) absorber; and
   a first fluid path extending sequentially through the $H_2S$ absorber, the first flash tank, the flash gas treatment column, the $H_2S$ absorber, and the $CO_2$ absorber, wherein the flash gas treatment column is configured to receive a flash gas produced by the first flash tank via the first fluid path, the flash gas comprising $H_2S$ and $CO_2$, and to receive a solvent such that the solvent and the flash gas are mixed to enable the solvent to entrain at least a portion of the $H_2S$.

2. The system of claim 1, wherein the first fluid path extends sequentially through the $H_2S$ absorber, the first flash tank, the flash gas treatment column, the $H_2S$ absorber, the $CO_2$ absorber, and the flash gas treatment column.

3. The system of claim 1, wherein the first fluid path extends sequentially through the $H_2S$ absorber, the first flash tank, the flash gas treatment column, the $H_2S$ absorber, the $CO_2$ absorber, and the $H_2S$ absorber.

4. The system of claim 1, comprising:
   a first solvent heat exchanger
   a first gas compressor; and a first gas heat exchanger, wherein the first fluid path extends sequentially through the $H_2S$ absorber, the first solvent heat exchanger, the first flash tank, the flash gas treatment column, the first gas compressor or the first gas heat exchanger, the $H_2S$ absorber, and the $CO_2$ absorber.

5. The system of claim 4, comprising:
a first solvent pump; and
a second solvent heat exchanger, wherein the first fluid path extends sequentially through the $H_2S$ absorber, the first solvent heat exchanger, the first flash tank, the flash gas treatment column, the first gas compressor or the first gas heat exchanger, the $H_2S$ absorber, the $CO_2$ absorber, the first solvent pump or the second solvent heat exchanger, and the $H_2S$ absorber.

6. The system of claim 1, comprising:
a first divergent path; and
a second divergent path, wherein the first fluid path splits into the first divergent path from the $CO_2$ absorber to the $H_2S$ absorber, and the first fluid path splits into the second divergent path from the $CO_2$ absorber to one or more flash tanks.

7. The system of claim 6, comprising a third divergent path, wherein the first fluid path splits into the third divergent path from the $CO_2$ absorber to the flash gas treatment column.

8. The system of claim 1, comprising:
a first divergent path;
a second divergent path; and
a solvent stripper, wherein the first fluid path splits into the first divergent path from the first flash tank to the flash gas treatment column, and the first fluid path splits into the second divergent path from the first flash tank to the solvent stripper.

9. The system of claim 8, wherein the second divergent path extends sequentially through the first flash tank, the solvent stripper, and the flash gas treatment column.

10. The system of claim 8, wherein the second divergent path extends sequentially through the first flash tank, the solvent stripper, and the $CO_2$ absorber.

11. The system of claim 1, comprising a gasifier configured to provide an untreated syngas to the $H_2S$ absorber.

12. The system of claim 1, wherein the first fluid path comprises an $H_2S$ rich, $CO_2$ rich solvent path from the $H_2S$ absorber to the first flash tank, a flashed gas path from the first flash tank to the flash gas treatment column, a first $H_2S$ lean, $CO_2$ rich gas path from the flash gas treatment column to the $H_2S$ absorber, a second $H_2S$ lean, $CO_2$ rich gas path from the $H_2S$ absorber to the $CO_2$ absorber.

13. A system, comprising:
a flash gas treatment column configured to integrate a carbon dioxide ($CO_2$) capture section with an acid gas removal (AGR) section, wherein the flash gas treatment column comprises a solvent path configured to route solvent from the flash gas treatment column to the $CO_2$ capture section, the flash gas treatment column comprises a gas path configured to receive flashed gas from the AGR section, and the flash gas treatment column is configured to output $CO_2$ rich gas.

14. The system of claim 13, wherein the flash gas treatment column is configured to output the $CO_2$ rich gas to an $H_2S$ absorber of the AGR section.

15. The system of claim 13, wherein the flash gas treatment column is configured to output the $CO_2$ rich gas to a $CO_2$ absorber of the $CO_2$ capture section, a $CO_2$ dehydration section, a $CO_2$ compression system, or any combination thereof.

16. The system of claim 13, wherein the solvent path routes the solvent from a solvent stripper and/or the $CO_2$ capture section to the flash gas treatment column.

17. A system, comprising:
an acid gas removal (AGR) section;
a carbon dioxide ($CO_2$) capture section; and
a flash gas treatment column configured to integrate the $CO_2$ capture section with the AGR section, wherein the flash gas treatment column is configured to receive a flashed gas comprising $H_2S$ and $CO_2$ and a solvent, and is configured to output $CO_2$ rich gas and $H_2S$ entrained solvent.

18. The system of claim 17, wherein the AGR section comprises a solvent stripper configured to remove $H_2S$ from the $H_2S$ entrained solvent to produce $H_2S$ lean solvent, and the $CO_2$ capture section is configured to receive the $H_2S$ lean solvent and return $H_2S$ lean, $CO_2$ rich solvent to the AGR section.

19. The system of claim 18, wherein the $CO_2$ capture section is configured to return $H_2S$ lean, $CO_2$ rich solvent to an $H_2S$ absorber of the AGR section and the flash gas treatment column.

20. The system of claim 17, wherein the flash gas treatment column is configured to output $CO_2$ rich gas to an $H_2S$ absorber of the AGR section to increase a concentration of $CO_2$ in the $H_2S$ absorber.

21. A system, comprising:
a hydrogen sulfide ($H_2S$) absorber;
a first flash tank;
a flash gas treatment column;
a carbon dioxide ($CO_2$) absorber;
a first fluid path extending sequentially through the $H_2S$ absorber, the first flash tank, the flash gas treatment column, the $H_2S$ absorber, and the $CO_2$ absorber;
a first divergent path;
a second divergent path, wherein the first fluid path splits into the first divergent path from the $CO_2$ absorber to the $H_2S$ absorber, and the first fluid path splits into the second divergent path from the $CO_2$ absorber to one or more flash tanks; and
a third divergent path, wherein the first fluid path splits into the third divergent path from the $CO_2$ absorber to the flash gas treatment column.

22. A system, comprising:
a flash gas treatment column configured to integrate a $CO_2$ capture section with an acid gas removal (AGR) section, wherein the flash gas treatment column comprises a solvent path configured to route solvent from the flash gas treatment column to the $CO_2$ capture section, the flash gas treatment column comprises a gas path configured to receive flashed gas from the AGR section, the flash gas treatment column is configured to output $CO_2$ rich gas, and wherein the solvent path routes the solvent from a solvent stripper and/or the $CO_2$ capture section to the flash gas treatment column.

* * * * *